United States Patent [19]

Webb et al.

[11] 3,821,317

[45] June 28, 1974

[54] BISFLUORENOLS

[75] Inventors: Jimmy L. Webb, Jonesville, N.Y.; Walter L. Hall, Mount Vernon, Ind.

[73] Assignee: General Electric Company, Schenectady, N.Y.

[22] Filed: May 26, 1971

[21] Appl. No.: 147,162

[52] U.S. Cl........ 260/619 B, 260/619 F, 260/345.3, 260/61, 260/47 XA, 260/47 C
[51] Int. Cl............................................. C07c 39/12
[58] Field of Search..................... 260/619 F, 619 B

[56] References Cited
OTHER PUBLICATIONS

Stillson et al., JACS, Vol. 67 (1945) 303–307.
Elsevier's Encyclopedia of Organic Chemistry, Series III, Vol. 13 (1946) 66–67.

*Primary Examiner*—Bernard Helfin
*Attorney, Agent, or Firm*—F. Wesley Turner; Joseph T. Cohen; Jerome C. Squillaro

[57] ABSTRACT

Bis(dibenzopyrans) prepared by reacting 2-phenylphenol and its higher homologues wherein the 6-position is substituted with a lower alkyl, including cycloalkyl, or phenyl, including lower alkyl substituted phenyl, substituent with bisketones are new chemical compounds. The bis(dibenzopyrans) are readily isomerized to the bisfluorenols. Since the latter compounds have two phenolic hydroxyl groups, they are useful in making polyesters, including polycarbonates, either as homopolymers or as copolymers with other dihydric phenols.

4 Claims, No Drawings

BISFLUORENOLS

This invention relates to novel bisfluorenols. The bis(dibenzopyrans) which can be isomerized to produce the bisfluorenols of this invention are covered in my divisional application (Docket RD-6176). These bis(dibenzopyrans) having the formula,

A.

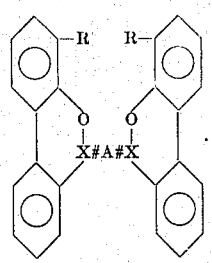

More specifically, this invention relates to the isomeric bisfluorenols of the above bis(dibenzopyrans) having the formula,

B.

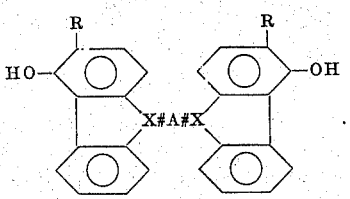

In both of the formulae, R is hydrogen, lower alkyl free of a tertiary α-carbon atom, phenyl or lower alkyl substituted phenyl and $$\overset{|}{X}\#A\#\overset{|}{X}$$

is,

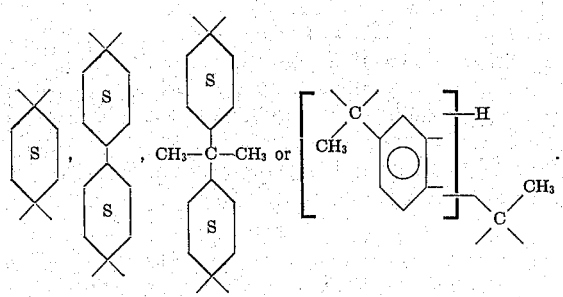

In our studies of the chemistry of 2,6-diphenylphenol, we found that this phenol, unlike almost all other phenols, did not react with aldehydes or ketones in the presence of the usual mineral acid catalysts to form bisphenols. This confirms the finding of J. Kahovec and J. Popisil, "Coll. Czechoslov. Chem. Comm.", 34, 2483 (1969) that this phenol does not react with acetone in the presence of the usual acid catalysts. Generally, no useful reaction occurs unless an inert medium whose acid strength, as measured on the Hammett $H_o$ scale, is at least as strong as trifluoroacetic acid. Under these very strong conditions, the particular product is dependent on the acid strength, the aldehyde or ketone and whether the phenol is 2,6-diphenylphenol or its isologue 2,6-diphenylthiophenol. Although 2-phenylphenol will react with aldehydes and ketones in the presence of the usual mineral acid catalysts to form bisphenols, the yield is generally quite low. When we studied this phenol under our very strong acid conditions, we found that it usually gave dibenzopyrans. We further found that this was true of any phenol including thiophenols having a phenyl substituent in at least one of the two positions ortho to the phenolic hydroxyl or mercapto group. A few aldehydes and ketones did produce bisphenols with 2,6-diphenylphenol. Under the very strongly acid conditions, alkyl groups having a tertiary α-carbon atom, i.e., there is no hydrogen on the carbon atom adjacent to the phenyl nucleus, either migrate to the para or 4-position or dealkylate. The various products obtained and the conditions to obtain them are more fully discussed in the following applications filed concurrently herewith and assigned to the same assignee as the present invention and which are hereby incorporated by reference.

Our copending application, Ser. No. 147,163, discloses the various ketones and aldehydes which will react with ortho-phenyl substituted phenols and thiophenols in an inert liquid phase whose acid stength, as measured on the Hammett $H_o$ scale, is at least as strong as trifluoroacetic acid, to yield the corresponding dibenzopyrans, which can be isomerized to their corresponding fluorenols, and dibenzothiopyrans.

Unlike other aldehydes and ketones, formaldehyde and acetaldehyde, preferably as their polymeric modifications, react in the presence of formic acid and trifluoroacetaldehyde, preferably as its hydrate, 1,1,1-trifluoroacetone, hexafluoroacetone and glyoxylic acid react under the above stronger acidic conditions with 2,6-diphenylphenol to form very good yields of the corresponding bisphenols. These bisphenols are disclosed and claimed in our copending application Ser. No. 147,165.

These same aldehydes and ketones did not give bisphenols with 2,6-diphenylthiophenols. Instead, the products were bisthioethers (thioacetals) except in the case of glyoxylic acid where the product was a dibenzothiopyran. Both 2,6-diphenylphenol and its thio isologue yield dibenzopyrans or dibenzothiopyrans with other aldehydes and ketones except for completely aromatic ketones which do not react at all. These dibenzopyrans, dibenzothiopyrans and the isomeric fluorenols of the dibenzopyrans are new chemical compounds and are disclosed and claimed in our copending application, Ser. No. 147,164.

Diketones in which there is at least one alkyl group attached to each ketonic carbonyl group, will react under these same conditions to form bis(dibenzopyrans) which can be isomerized to their corresponding bisfluorenols. These are new chemical compounds and are the subject of the present invention.

In general, the compounds of this invention are made by reacting an o-phenylphenol with the diketone in an acidic liquid phase in which the reactants are soluble and which is nonreactive with the other components, contains no more than 5 percent by volume water and whose acid strength, as measured on the Hammett $H_o$ scale, is at least as strong as trifluoroacetic acid. On the Hammett $H_o$ scale, the values are called Hammett $H_o$ acidity functions and range from positive to negative numbers. The more negative the number, the stronger the acid. For a more complete discussion of the Hammett $H_o$ acidity functions, reference is made to the book "Acidity Functions" by Colin H. Rochester, Academic Press, New York (1970). This book and its references are hereby incorporated by reference for a teaching concerning acidity functions of various acids and the factors which effect the particular value in various systems in which the acids are dissolved. The liquid phase can be either the straight acid having the required acid strength or it can be an inert organic liquid in which the acid is dissolved in sufficient quantity to give the desired acid strength.

Preferably the liquid phase should be a solvent in which the amounts of both reactants used are completely soluble. However, this is not a requisite and heterogeneous reaction mixtures can be used when the reactants are sufficiently soluble in the liquid phase to give a reasonable reaction rate. Preferably, any inert organic liquid used as a diluent and solvent for the acid should be aprotic and should have a high dielectric constant since such a solution will have a higher negative Hammett $H_o$ activity function for a given acid than a solvent having a low dielectric constant.

Typical examples of acids that are readily available which we can use to provide the required acidity are: hydrogen fluoride, trifluoracetic acid, mono-, di- and hexa-fluorophosphoric acids, fluoboric acid, methanesulfonic acid, trifluoromethanesulfonic acid, etc. Mixtures of these acids can be used but offer no advantage over the use of a single acid.

If desired, the acids, especially those having a very high negative Hammett $H_o$ activity function can be diluted with a wide variety of organic liquids to provide the liquid phase still having the requisite acidity. As is self-evident, the diluent should not be reactive with either the acid or reactants and must be miscible with the acid. Preferably, but not necessary, the diluent should increase the solubility of the reactants in the liquid phase. Aprotic solvents having a high dielectric constant are the preferable diluents to use. Examples of readily available organic liquids we can use are: nitromethane, nitrobenzene, sulfolane, chloroform, chlorobenzene, o- or m-dichlorobenzene, the chlorotoluenes, etc. The particular solvent is not critical and its choice is dependent on the desires of the operator.

The phenols which can be used in preparing the compounds of this invention are those having the formula,

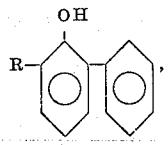

where R is as defined above for formulae A and B. Typical examples of substituents which R can be are methyl, ethyl, propyl, isopropyl, the various butyl substituents, e.g., n-butyl, sec-butyl, 2-methylpropyl, cyclobutyl, etc., the various pentyl, hexyl, heptyl, octyl, etc., substituents, etc., phenyl, and phenyl substituted with the above lower alkyl groups.

Any diketone that has at least two carbon atoms between each carbonyl group and the latter each has attached to it an aliphatic carbon atom having at least one hydrogen and no more than one halogen, can be used in the reaction. However, not many such diketones are readily available and so from a practical point of view the particular ketones of this invention are those having the formulae,

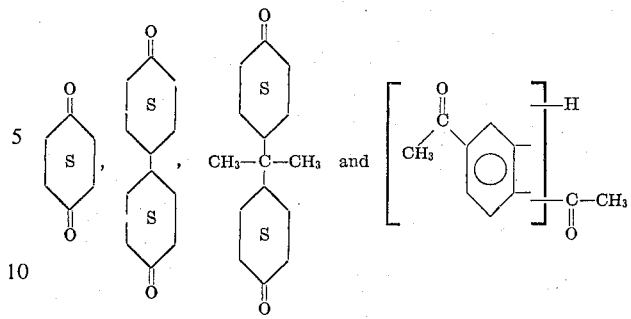

In the latter formula, the two diketones are m- and p-diacetylbenzenes.

As is evident, water is a product of the dibenzopyran and dibenzothiopyran forming reaction. Therefore, the reaction is aided by using anhydrous liquid phase initially or at least limiting the amount of water present initially to no more than 5 percent by volume. This also aids the reaction since the acidity of such systems is higher than when more water is present. Azeotropic distillation, use of inert desicants, etc., can also be used to remove the water of reaction.

The rate of reaction of the diketones with the o-phenylphenols is governed by the acidity of the organic reaction medium. The stronger the acidity, the faster the reaction. Likewise, heating will also speed up the rate of reaction. Increased reaction times, higher temperatures and increased acidity of the reaction medium favors isomerization of the bis(dibenzopyrans) to the corresponding bisfluorenols. Therefore, when the bis(-dibenzopyrans) are the desired product conditions should be chosen that do not favor the isomerization to the bisfluorenols, i.e., lower temperatures, lower acidity, etc. The bisfluorenols can be obtained without isolating the bis(dibenzopyrans) by merely continuing the reaction for a longer period of time or using initial reactions conditions which highly favor the formation of the bisfluorenols. Even after isolation of the bis(dibenzopyrans), they can be isomerized to the bisfluorenols by redissolving them in the highly acidic medium and preferably heating. Isomerization can also be effected with Lewis acids, for example, $AlCl_3$, $BF_3$, in trifluoroacetic acid, etc.

In order that those skilled in the art may better understand our invention, the following examples are given by way of illustration and not by way of limitation. In all of the examples, parts are by weight and temperatures are in degrees Centigrade unless otherwise noted. Where elemental analysis is given for a named compound, the theoretical values calculated for this compound are given in parentheses after the analytically determined values. Examples 1, 3–6 and 8 illustrate the making of typical bis(dibenzopyrans) which can be isomerized to the bisfluorenols of this invention by the methods disclosed in this application.

EXAMPLE 1

A solution of 17.02 g. of o-phenylphenol and 8.11 g. of m-diacetylbenzene in 90 ml. of nitromethane was prepared and 10 ml. of distilled difluorophosphoric acid added. After heating for 2 hours at 80°, the reaction mixture was quenched by adding water and then diluting with chloroform. After separating the organic layer, it was washed three times with water and dried over anhydrous sodium sulfate. After the solvent was removed under vacuum, the residue was dissolved in hexane containing the minimum amount of chloroform to dissolve it and chromatographed on silica using portions of hexane-chloroform mixtures of increasing chloroform content as eluent. The first fraction, after evaporation of the solvent, weighed three g. and was identified by *nmr*, ultraviolet and mass spectrometry as the bis-(dibenzopyran) having the formula,

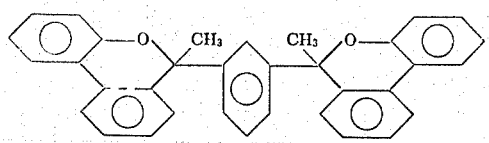

Elemental analysis showed: C, 87.9, 88.1 (87.5); H, 5.7, 5.9 (5.62).

A second material was eluted after the above bis-(dibenzopyran), whose nmr spectrum showed it to be 6-(4-acetylphenyl)-6-methyl-6H-dibenzopyran resulting from the reaction product of one mole of the phenol with one mole of the diketone.

EXAMPLE 2

A mixture of 20 g. of o-phenylphenol, 8.1 g. of m-diacetylbenzene and 100 ml. of diethylether was placed in a 500 ml. polytetrafluoroethylene bottle. After cooling to 0°, 400 ml. of liquid, anhydrous hydrogen fluoride was added, the bottle capped tightly and the contents stirred vigorously with a magnetic stirrer as it warmed to room temperature. Samples were taken periodically and analyzed by thin layer chromatography which indicated that after 20 hours the reaction was actually 95percent complete for the conversion to the bisfluorenol. The reaction mixture was cooled and then poured onto ice and the organic phase diluted with chloroform. After separating the organic layer, washing with water and drying over anhydrous magnesium sulfate, the solvents were evaporated under vacuum to yield 23.4 g. of a tan somewhat tacky solid product which was shown to be greater than 99 percent of the pure bisfluorenol having the structure,

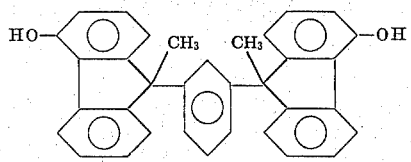

The product was further purified by chromatography on a silica gel column using chloroform as the eluent. The product was isolated as a white crystalline solid having a metling point of 211°-214°, whose structure was confirmed by infrared, *nmr* and mass spectrometry. Elemental analysis showed: C, 87.6 (87.5); H, 5.9 (5,6).

EXAMPLE 3

A solution of 38 g. of o-phenylphenol in 500 ml. of trifluoroacetic acid was heated to reflux and 10 g. of 1,4-cyclohexanedione was added. After refluxing for 3 hours, the reaction mixture was cooled and filtered to yield 7.25 g. of the bis(dibenzopyran) having the formula,

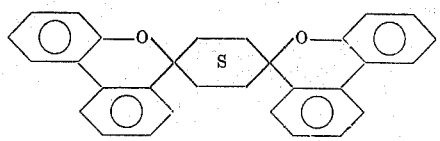

as a white crystalline solid having a melting point of 292°-293°. After recrystallization from toluene, the melting point was raised to 293°-294°. Its structure was confirmed by infared, *nmr* and mass spectrometry. Elemental analysis showed: C, 86.7 (86.5); H, 5.8 (5.8).

EXAMPLE 4

A solution of 50 g. of 2-methyl-6-phenylphenol in 400 ml. of trifluoroacetic acid was heated to reflux and 10 g. of 1,4-cyclohexanedione was added. After heating at reflux for 1 hour, the reaction mixture was filtered to yield 10.82 g. of the product having a melting point of 300°-301°. The filtrate was returned to the reaction flask and refluxed an additional 3 hours to yield an additional 6.2 g. of product having a melting point of 294°-298°. The two precipitates were combined and recrystallized from hot chloroform to yield 13.1 g. of the bis(dibenzopyran) having the formula,

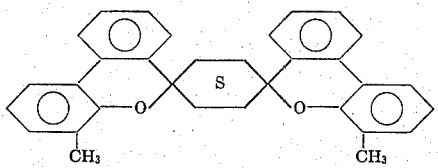

as a white crystalline solid having a melting point of 302°-303° whose structure was confirmed by infrared, ultraviolet, nmr and mass spectrometry. Elemental anaylsis showed: C, 86.8 (86.4); H, 6.4 (6.3).

EXAMPLE 5

A solution of 3.68 g. of 2-methyl-6-phenylphenol in 50 ml. of trifluoroacetic acid was heated to reflux and 1.94 g. of 4,4'-bicyclohexanone was added. After heating at reflux for 35 minutes, the reaction mixture was cooled and filtered, the precipitate washed with trifluoroacetic acid and then methanol after which it was dried. A yield of 3.1 g. of crude material was obtained which was recrystallized from benzene to give 2.77 g. of the bis(dibenzopyran) having the structure,

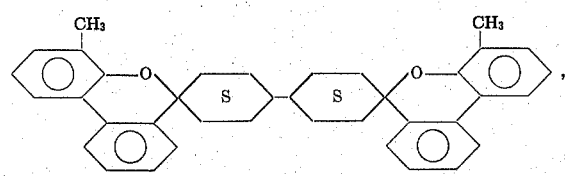

having a melting point of 272°-273° and whose structure was confirmed by infrared, ultraviolet, *nmr* and mass spectrometry, Elemental analysis showed: C, 86.2 (86.6); H, 7.3 (7.3).

EXAMPLE 6

A mixture of 46.05 g. of 2-methyl-6-phenylphenol and 23.64 g. of 4,4'-isopropylidenedicyclohexanone was prepared and 500 ml. of trifluoroacetic acid added at room temperature. The reaction mixture was heated at reflux for 1.5 hours, cooled to room temperature and filtered yielding 54.6 g. of a white crystalline product. Recrystallization from hot toluene gave 38.79 g. of the bis(dibenzopyran) having the structure,

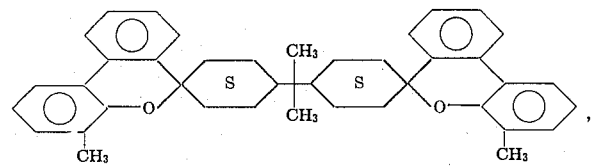

whose melting point was 272°–273°. Its structure was confirmed by infrared, ultraviolet, nmr and mass spectrometry. Elemental analysis showed: C, 86.3 (86.5); H, 7.7 (7.8).

EXAMPLE 7

In addition to being able to convert a bis(dibenzopyran) of this invention to its corresponding bisfluorenols using the acidic conditions used in preparing the bis(-dibenzopyrans), Lewis acids, for example, aluminum chloride, can also be used as shown by this example. A solution of 20 g. of the bis(dibenzopyran) of Example 6 in 200 ml. of chlorobenzene was prepared and 1.5 g. of aluminum chloride was added. The reaction mixture was maintained at 60° with stirring overnight. Analysis by thin layer chromatography showed that the reaction was essentially complete. A saturated aqueous solution of ammonium chloride was added to quench the reaction. The organic layer was separated, washed and the solvent evaporated. The residue was dissolved in a minimum amount of hot toluene and allowed to stand. The crystalline precipitate which was isolated by filtration, washing and drying, weighed four g. and had a melting point of 276°–278°. Infrared, nmr and mass spectrometry confirmed that it was the bisfluorenol having the formula,

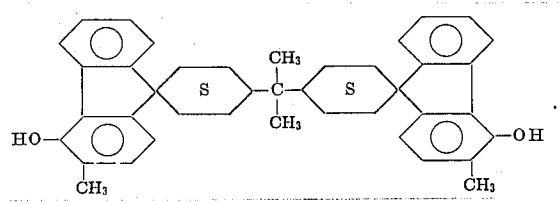

Elemental analysis showed: C, 86.7 (86.6); H, 7.9 (7.8).

EXAMPLE 8

A mixture of five g. of 2-cyclohexyl-6-phenylphenol and 2.34 g. of 4,4'-isopropylidenedicyclohexanone was prepared and 75 ml. of trifluroacetic acid added at room temperature. The pink solution was heated to reflux causing a light grey precipitate to form within 7 minutes. After heating an additional 1.4 hours at reflux, the mixture was cooled and filtered yielding a light grey crystalline material which was recrystallized from hot toluene to yield 3.8 g. of the bis(dibenzopyran) having the formula,

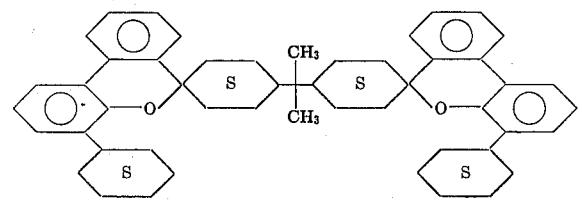

whose melting point was 259°–261°. Its structure was confirmed by infrared, ultraviolet, nmr and mass spectrometry. Elemental analysis showed: C, 86.6 (86.9); H, 8.3 (8.6).

As has been shown above, the bis(dibenzopyrans) of my above-identified divisional application are readily converted to their corresponding bisfluorenols. These bisfluorenols can be used to make polyesters, polycarbonates, polyurethanes, etc.. The polyesters can be made using either apliphatic or aromatic dicarboxylic acids and a mixture of one or more of such dicarboxylic acids can be used to prepare copolyesters. For example, the bisfluorenol of Example 7 was dissolved in dichloromethane containing pyridine and reacted with phosgene to give a polycarbonate which was still soluble. Likewise, a soluble polyester was made from the bisfluorenol of Example 2 by interfacial polymerization with isophthaloyl chloride. Likewise, one or more of the fluorenols can be used in making the polyesters, polycarbonates, or polyurethanes. These polymeric products can be used to make molded objects, films, fibers, etc..

By first forming the bischloroformate from our bisfluorenols and then reacting this product with bisphenols of the prior art, block polycarbonates can be obtained in which the bisfluorenol moiety of the present invention alternates along the polymer molecule with the bisphenol moieties of the prior art.

The above examples have shown some of the variations which are possible with our invention. Other variations will be readily apparent to those skilled in the art in light of the above teaching. All such variations are in the full intended scope of the invention as defined by the appended claims.

We claim:

1. Bisfluorenols having the formula,

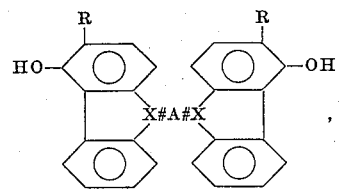

where R is hydrogen, lower alkyl free of a tertiary α-carbon atom, phenyl or lower alkyl substituted phenyl and

X#A#X is,

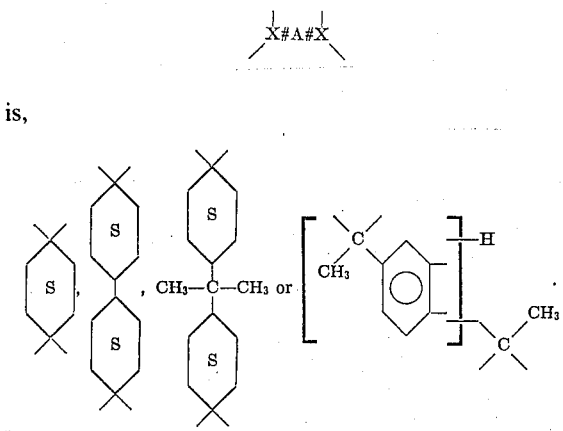

2. The bisfluorenol of claim 1, having the formula,
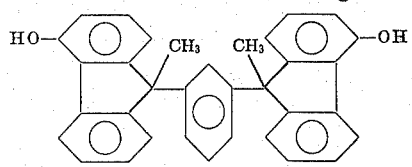
3. The bisfluorenol of claim 1, having the formula,
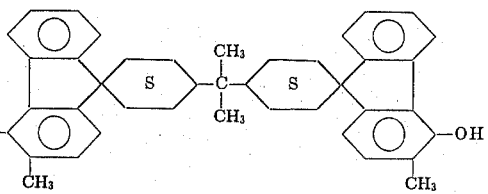
4. The bisfluorenols of claim 1, wherein R is lower alkyl free of a tertiary α-carbon atom.
* * * * *